Patented Oct. 16, 1934

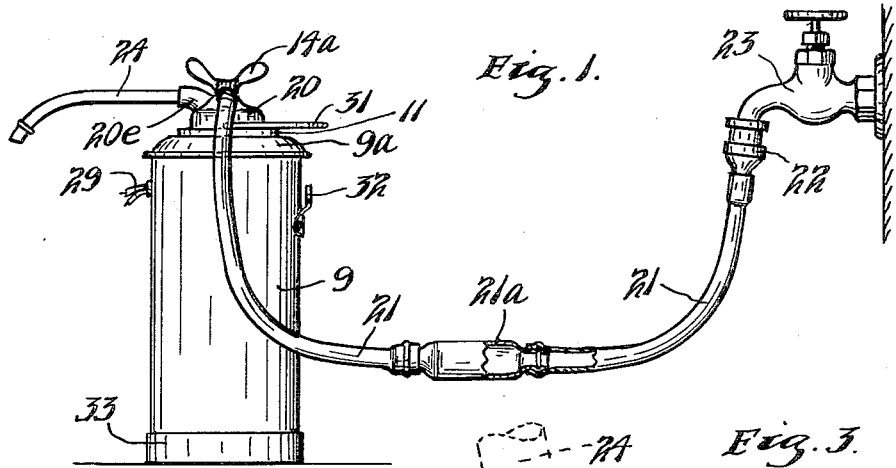
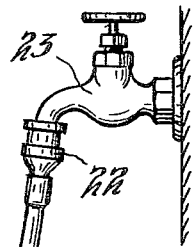
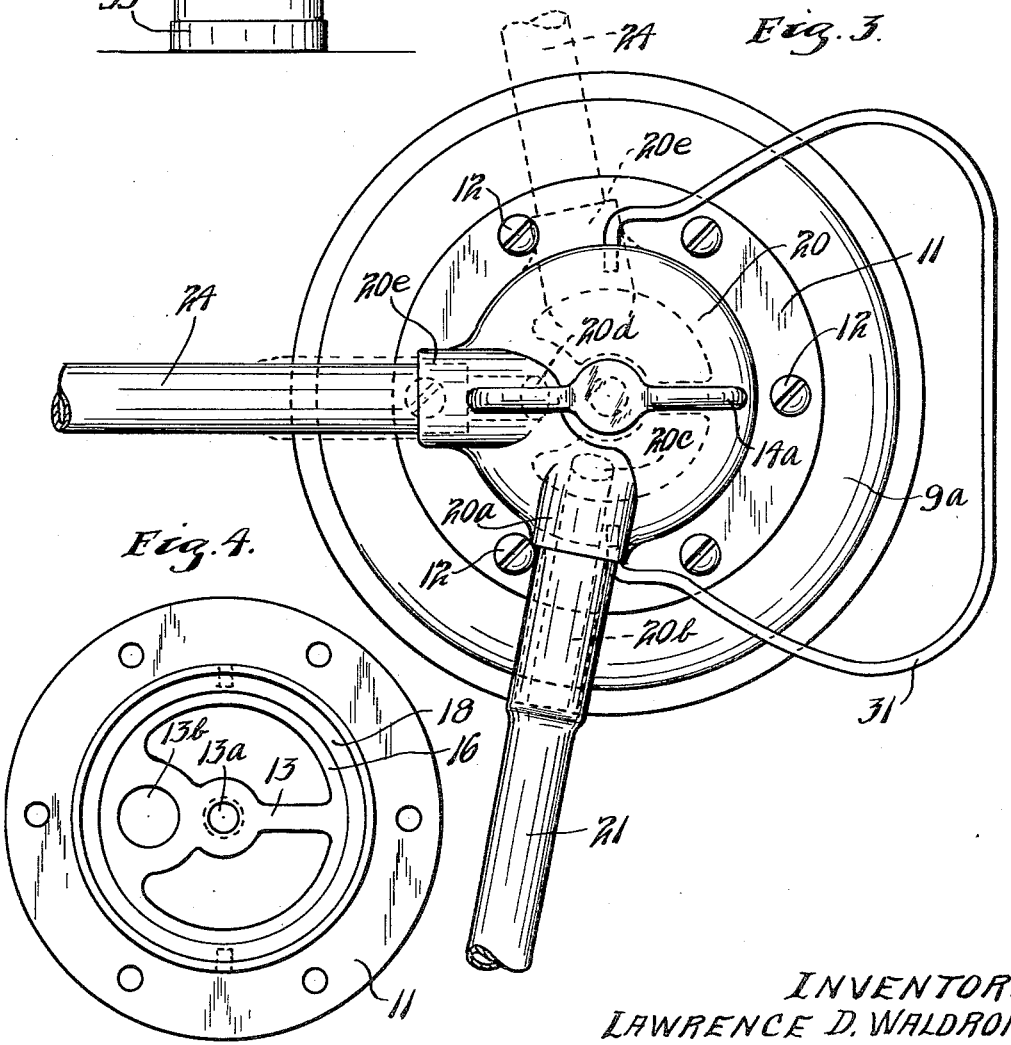

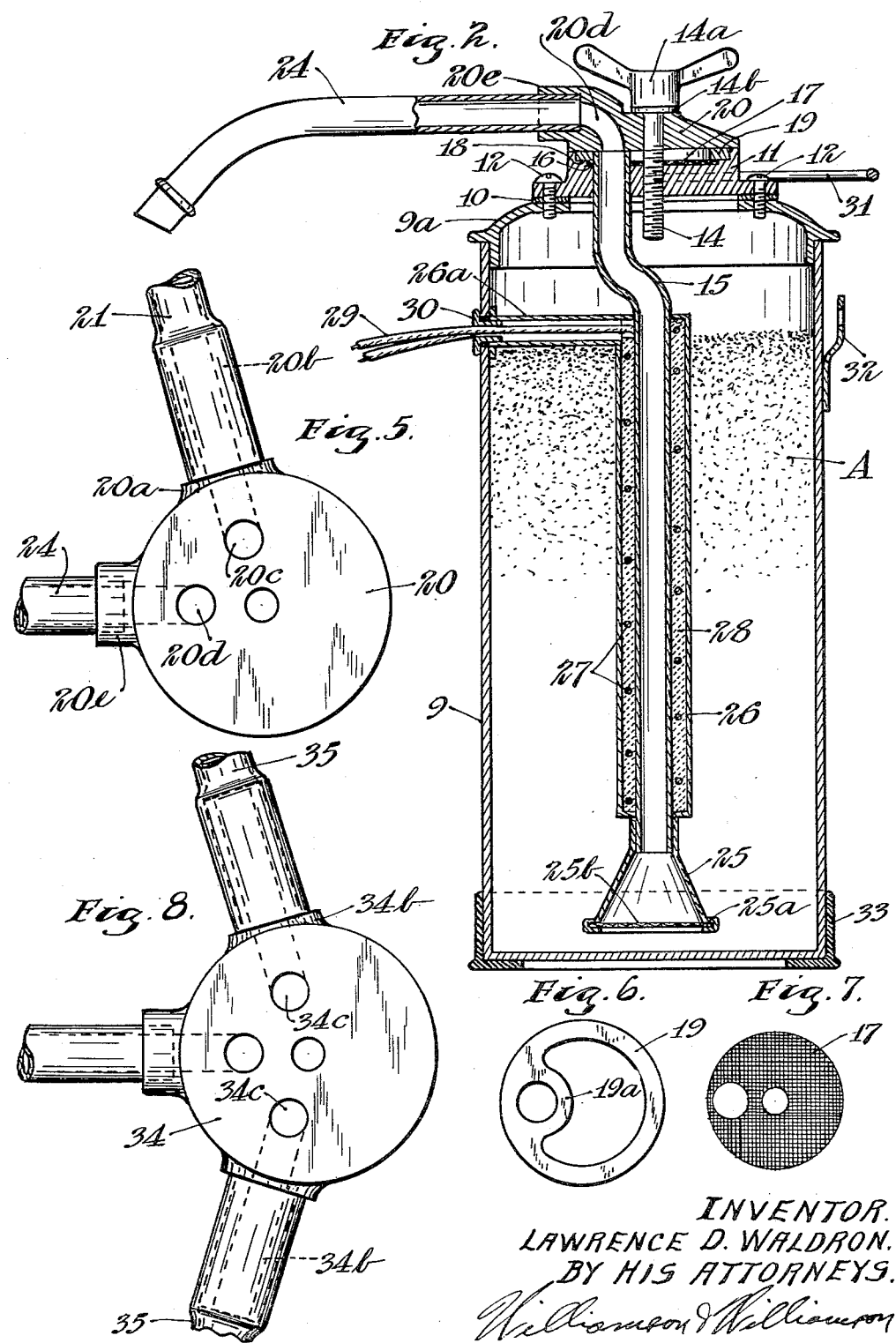

1,976,906

UNITED STATES PATENT OFFICE 1,976,906

WATER SOFTENER

Lawrence D. Waldron, Minneapolis, Minn.

Application February 26, 1934, Serial No. 712,929

9 Claims. (Cl. 210—24)

This invention relates to water softeners.

It is the general object of the present invention to provide a novel and improved water softener of cheap and simple construction, which can be quickly and effectively cleaned and reconditioned from time to time without difficulty.

The objects and advantages of the invention will more fully appear from the following description made in connection with the accompanying drawings, wherein like reference characters refer to the same or similar parts throughout the various views, and, in which, Fig. 1 is a view in side elevation illustrating a water softener embodying the invention connected for use, certain of the parts being broken away and shown in section to more clearly illustrate the construction thereof;

Fig. 2 is a vertical transverse section taken through the tank of the water softener;

Fig. 3 is a plan view looking down on the tank, certain of the parts being shown in one position in full lines and in another position in dotted lines;

Fig. 4 is a plan view of a collar that is used;

Fig. 5 is a bottom plan view of a bonnet;

Figs. 6 and 7 are respectively plan views of a gasket and strainer screen; and

Fig. 8 is a bottom plan view of a modified form of bonnet that may be used.

Referring to the drawings, there is provided in accordance with the invention a cylindrical tank 9 closed at its bottom and provided at its upper end with an annular member 9a partially closing the upper end of the tank. A gasket 10 seats on the member 9a and the flange of a flanged collar 11 rests on this gasket. Collar 11 is secured to tank 9 as by means of screws 12 running through openings in the flange of the collar and extending through openings in the gasket 10 and screwed home into the member 9a. The collar 11 is provided with a cross rib 13 having a central tapped opening 13a within which a screw 14 is normally received. This screw 14 is preferably provided with a head 14a equipped with wings, so that the screw may be readily turned. The rib 13 also forms a socket 13b within which the upper end of a tube 15 is received and held. The upper end of the tube 15 projects above the socket 13b to a point level with the upper edge of the collar 11, the rib 13 being depressed somewhat below the upper edge of the collar.

The inner part of the collar 11 together with the rib 13 form a seat 16 for a circular strainer screen 17. This strainer screen is provided with a central opening through which the screw 14 normally extends and it is also provided with an eccentric opening through which the upper portion of the tube 15 normally extends. Level with the upper surface of the screen 17 when in place on its seat 16, there is provided on collar 11 a seat 18 for a heavy gasket 19 preferably made of rubber or analogous resilient material. This gasket 19 is of ring-shape, as best shown in Fig. 6, but it includes an eye portion 19a which encircles the upper portion of the tube 15. Gasket 19 normally projects slightly above the upper edge of collar 11.

Normally bearing against the upper surface of the gasket 19 is a bonnet 20 of circular-shape and having a flat under surface. This bonnet has a central opening therein through which the screw 14 projects and the head 14a of the screw is provided with a sealing washer 14b which seals this central opening in the bonnet when the screw is screwed home to the position shown in Fig. 2. The bonnet 20 is provided on its upper and outer surface with a socket 20a provided with an outwardly extending nipple 20b and to this nipple is attached a flexible tube or hose 21 equipped at its end remote from the nipple with an adapter 22 adapted to be attached as to a water faucet 23. The hose 21 is divided into two sections which are attached at their adjacent ends to nipples formed at the ends of a light metal tube 21a formed of aluminum, or similar material, having a high coefficient of heat conductivity. This tube may be called a tempering tube because of its function as will hereafter be brought out.

The nipple 20b in bonnet 20 communicates with a passage 20c formed in the bonnet and terminating in an inlet port at the bottom of the bonnet. There is also provided on the outer and upper surface of the bonnet a socket 20e within which a water discharge tube 24 is mounted. This discharge tube projects laterally from the bonnet and terminates in a downwardly curved end equipped with an exterior rib to permit a hose to be attached to the tube if desired. The discharge tube 24 communicates with a passage 20d extending through the bonnet 20 to the underside of the same and forming an outlet port for water at the bottom of the bonnet. The inlet port formed by the passage 20c and the outlet port formed by the passage 20d are circumferentially spaced from each other and they are radially spaced from the center of the bonnet 20 a corresponding distance and the centers of these ports are radially spaced from the center of the bonnet a distance corresponding to the spacing of the center of the upper end of the tube 15 from the axial center of the screw 14. The said ports are slightly smaller in diameter than the upper end of the tube 15 and it will be seen that when the bonnet is rotated to one position relative to the tank, the outlet port formed by the passage 20d may be brought into registry with the upper end of the tube 15, as shown in Fig. 2 and in full lines Fig. 3, and when the bonnet is rotated to a second position relative to the tank, the inlet port formed by the passage 20c may be brought into registry with the upper end of the tube 15, as shown in dotted lines Fig. 3. Normally the screw 14 will be tightened downwardly against the bonnet, so as to prevent the bonnet from rotating and to hold the bonnet in the position shown in Fig. 2 and in full lines Fig. 3.

The tube 15 runs downwardly from the top of the collar 11 to a point near the bottom of the tank 9 and it is offset below its upper end so that the lower part of the tube is centrally disposed in the tank. At its lower end a funnel 25 is attached to the tube 15, the flaring mouth of this funnel being disposed downwardly. This funnel is provided with a seat 25a against which a strainer screen 25b bears and the lower edge of the funnel is crimped inwardly against the screen to hold it in place. The lower end of the funnel is disposed in closely spaced relation from the bottom of tank 9.

A tubular sleeve 26 encircles the major part of the tube 15 and the lower end of this tube is crimped inwardly and welded or otherwise secured to the tube to form a water tight joint. The sleeve 26 at its upper end is also provided with a closure welded or otherwise secured to the tube 15 to form a tight joint therewith and a lateral extension tube 26a communicating with the sleeve 26 projects outwardly therefrom through an opening in the wall of the tank. The tube 15 and the sleeve 26 form a casing within which an electrical heating element 27 is mounted, this electrical heating element being of spiral-shape and embedded in refractory material 28 of tubular shape. A pair of electrical conductors 29 connected to the heating element 27 extend through the tube 26a to a point outside the tank and these conductors may be connected in any suitable manner to a source of electricity. An apertured nut 30 attached to the outer end of the tube 26a centrally locates the conductors 29 in this tube and while permitting heated air in small quantities to escape from the chamber formed by the tube 15 and sleeve 26, it acts to hold most of the heated air in this chamber.

Attached to the collar 11 is a bail-shaped handle 31, which can be used for lifting or supporting the water softener, and this handle when in vertical position forms stops limiting the possible rotation of the bonnet 20 relative to the tank. When the bonnet is swung in a counter clockwise direction, so that the socket 20a strikes one arm of the bail handle, then the bonnet is so positioned that the outlet port of passage 20d is alined with tube 15. When the bonnet is swung in a clockwise direction to the position in dotted lines Fig. 3 so that the socket 20e strikes one arm of the bail handle 31, then the inlet port formed by the passage 20c is alined with the upper end of the tube 15.

Attached to the tank 9 is a suitable apertured bracket 32 whereby the tank may be hung as from a nail and it will also be appreciated that, if desired, the tank may be hung from the bail handle 31. Preferably a flanged rubber annulus 33 is slipped around the lower end of the tank so as to prevent the tank from marring a table or other support upon which it may be rested, as well as to prevent the tank from slipping on such a support.

In preparing the water softener for use, the collar 11 is first removed and a granular water softening material A, such as zeolite, is placed within the tank 9. The tank is filled with this water softening material A to about the level shown in Fig. 2, to form a bed, whereupon a quantity of ordinary table salt is placed in the tank above the water softening material A. Collar 11 is then replaced on the tank. The adapter 22 is connected as to a water faucet 23, or other suitable source of water supply, whereupon the water softener is ready for use. In position for use, the bonnet 20 is located as shown in Fig. 2, and in full lines Fig. 3, so that the outlet port, formed by the passage 20d, is in communication with the upper end of the tube 15, while no direct communication between the inlet port, formed by the passage 20c, and the upper end of the tube 15 is possible.

Water may be supplied to the tank 9 from the faucet 23 through the hose 21, tempering tube 21a, nipple 20b and inlet passage 20c. This water will run downwardly through the opening in the collar 11 into the top of the tank 9 and it will seep through the salt and water softening chemical A to the bottom of the tank. When the tank is full of water, water from the bottom of the tank will pass upwardly through the strainer 25b into funnel 25 and this water will pass on upwardly through tube 15 to discharge through the outlet passage 20d and discharge tube 24. After a small quantity of water has been run through the water softener to carry off any surplus salt or chemicals from the water softening material A and the salt placed in the tank, the water is ready for use. As the water seeps through the water softening material A the impurities and chemicals in the water that make the same hard will be removed, so that as the water discharges from the discharge tube 24 or spout, the water will be quite soft. The strainer 25b in the funnel 25 will, of course, prevent any of the water softening material A from being carried out of the tank 9. The gasket 19 will prevent the leakage of water between bonnet 20 and collar 11 and the eye portion 19a of the gasket which is clamped between the bottom of bonnet 20 and screen 17 will prevent the fresh water admitted at the top of the tank from being carried over to the outlet passage 20d without first passing through the water softening material A.

If it is desired to heat the water passing through the tank, this can be readily accomplished by supplying electricity to the electrical conductors 29 to cause the heating element 27 to heat up. This heating element will impart a high degree of heat to the water passing up through tube 15 and it will also act to heat the body of water in the tank 9 prior to the passage of the water through the tube. The heating element is incased so that no water can get to the same and the refractory material 28 insulates the heating element electrically. It is believed that the heat imparted to the water and to the water softening material A by means of heating element 27 will cause the water softening material to better absorb the impurities and chemicals in the water so as to produce a better water softening action than would otherwise be the case if the heating element was not used.

When the water softener is in use, assuming that no electricity is being supplied to the heating element, it is often highly desirable to exactly temper the water passing through the water softener. These water softeners are extensively used in beauty shops in rinsing and washing women's hair and it is highly desirable that the water be kept at the proper temperature to prevent the scalp of the woman being treated from being burned or chilled. One hand of the operator using the device may be kept on the tempering tube 21a and as this tube is of light weight metal of a type that conducts heat readily, the tube will naturally take approximately the same temperature as the water passing through the same and by feeling this tube the operator of the device may readily gauge the temperature of the water passing through the water softener.

After the water softener has been used for some time, it is desirable to revivify the water softening material A by cleaning the same and by utilizing ordinary table salt to form dissolvable compounds with certain other chemicals that may have been caught by the water softening material A or which have formed compounds therewith. To thoroughly cleanse the water softening material A, it is desirable to pass water through the same in the inverse direction than normally. This can be readily done with ease using the water softener of the invention. The screw 14 will first be loosened by turning the winged head 14a thereof whereupon the bonnet 20 may be swung from the position shown in Fig. 2 and in full lines Fig. 3, to the position shown in dotted lines Fig. 3, i. e. the bonnet is swung in a clockwise direction, as viewed in Fig. 3, until further swinging movement is prevented by engagement of the socket 20e with the bail handle 31, when this bail handle is held in an upright position. The screw 14 may then again be tightened, whereupon the inlet port formed by the passage 20c will be alined with the upper end of the tube 15 and the outlet port formed by the passage 20d will be in free communication with the main body of the tank 9. Water may then be again supplied to the tank and this water will pass through passage 20c downwardly through tube 15 and funnel 25 to the bottom of the tank, whereupon the water will rise through the water softening material A to the top of the tank, and pass on out through the outlet passage 20d and spout 24. The screen 17 is of such mesh that it will prevent the water softening material A from being carried out of the tank, but it will not prevent fine impurities that may have been caught by the water softening material from being eliminated from the tank. The water softening material A may thus be readily cleansed by reversing the flow of water through the same. To further revivify the water softening material A, a quantity of salt may be placed within the tank by removal of the collar 11 whereupon the tank may be filled with water and allowed to stand for a period of time. The salt combines with certain of the chemicals taken up by the water softening material to form dissolvable compounds and when water is again run through the water softener, these compounds will be carried out of the tank.

After the water softening material A has been cleansed and revivified, the bonnet 20 may be relocated in its normal position and the device is again ready for use.

In Fig. 8 a slightly different type of bonnet designated by the numeral 34 is illustrated. This bonnet is exactly similar to the bonnet 20 with the exception that it is provided with two inlet passages 34c and two nipples 34b communicating therewith. The passages 34c are similar to the passage 20c in the previously described bonnet 20. Hoses 35 running respectively from hot and cold water supply means are connected to the respective nipples 34b. With the arrangement illustrated in Fig. 8, the water may be properly tempered within the tank 9 by admitting cold water to the tank through one of the hoses 35 and hot water to the tank through the other hose 25.

The device of the invention has been successfully demonstrated in actual practice.

It will, of course, be understood that various changes may be made in the form, details, arrangement and proportions of the various parts without departing from the scope of the present invention, which, generally stated, consists in the matter shown and described and set forth in the appended claims.

What is claimed is:—

1. A water softener comprising a tank containing a bed of water softening material, directing means within said tank for causing water admitted to said tank to pass through said bed in a defined channel, said tank having an opening therein at one end of the same, a bonnet normally closing said opening and swingable to two different positions on said tank, means for supplying water through said bonnet into the interior of said tank, means for carrying off the water through said bonnet from the interior of said tank, one of said two last mentioned means being in communication with one end of said channel and the other of said last two mentioned means being in communication with the other end of said channel when said bonnet is swung to one of its said two positions, and the communication between said last two mentioned means and the respective ends of said channel being reversed when said bonnet is swung to the other of its said two positions whereby by shifting the position of said bonnet the direction of water flow through said bed may be reversed.

2. A water softener comprising a tank containing a bed of water softening material, a directing conduit for directing the flow of water through said bed, said tank having an opening at one end thereof, a bonnet normally closing said opening, said bonnet having water inlet and outlet passages therethrough, means exterior of said tank for supplying water to said inlet passage, means for carrying off the water from said outlet passage, said bonnet being swingable to two different positions on said tank, said directing conduit being so located relative to said passages that when said bonnet is swung to one of said two positions said inlet passage will exclusively communicate with one end of said directing conduit and when said bonnet is swung to the other of its said two positions said outlet passage will exclusively communicate with the same end of said directing conduit whereby the direction of flow of water through said bed may be reversed.

3. A water softener comprising a tank containing a bed of water softening material, a conduit mounted in said tank and running downwardly from adjacent the top of the tank to a point adjacent the bottom of the tank, water supply means at the top of the tank communicating with the interior of the tank, water discharge means at the top of the tank communicating with the interior of the tank, and means for selectively exclusively placing a desired one of said means in communication with the upper end of said conduit whereby the direction of water travel through said tank and bed may be reversed.

4. A water softener comprising a tank containing a bed of water softening material, said tank having an opening at its upper portion, a bonnet normally closing said opening and swingable from a first to a second position on said tank, said bonnet having two passages therethrough forming first and second ports at the underside of said bonnet, means exterior of said tank for supplying water to one of said passages, means exterior of said tank for carrying off water from the other of said passages, a conduit mounted within said tank and extending from the underside of said bonnet to a point adjacent the bottom of said tank, said second port to the exclusion of said first port being aligned with the upper end of said conduit to communicate therewith when said bonnet is swung to said first position and the said first port to the exclusion of said second port being aligned with the upper end of said conduit to communicate therewith when said bonnet is swung to said second position whereby by swinging said bonnet from one position to the other the direction of water flow through said bed may be reversed.

5. The structure defined in claim 4, and means for clamping said bonnet tightly in position on said tank.

6. The structure defined in claim 4, said tank having a gasket seat adjacent said opening and surrounding an upper portion of said conduit, a sealing gasket interposed between the underside of said bonnet and said seat and means for releasably clamping said bonnet tightly against said gasket.

7. A water softener comprising a tank holding a bed of water softening material and having an opening at its upper end, a bonnet normally closing said opening and rotatable to different positions at the top of said tank, means for clamping said bonnet in place to prevent movement thereof, said bonnet having two passages therethrough terminating in ports at the under side of said bonnet, said ports being circumferentially spaced from each other and radially spaced the same distance from the center of rotation of said bonnet, means exterior of said bonnet for supplying water to one of said passages, means exterior of said bonnet for carrying off water from the other of said passages, and a tube supported in said tank and running downwardly from said opening to a point adjacent the bottom of said tank, the upper end of said tube being positioned to align selectively with said ports when said bonnet is rotated to different positions.

8. A water softener comprising a tank containing a bed of water softening material, said tank having an opening at its upper end, a strainer screen covering said opening, a resilient gasket located over said strainer screen, a bonnet normally bearing against said gasket and closing said opening, means for clamping said bonnet tightly against said gasket, said bonnet being swingable relative to said tank when said clamping means is released, said bonnet having two passages therethrough terminating in ports at the under side of said bonnet, a tube extending through said strainer screen and projecting from said opening downwardly into said tank to a point adjacent the bottom of the tank, a strainer screen at the lower end of said tube and means for holding said tube with its upper end in such position that it will selectively exclusively register with respective ports when said bonnet is swung to two different positions, means exterior of said bonnet for supplying water to one of said passages and means exterior of said bonnet for carrying off the water from the other of the said passages.

9. A water softener comprising a tank containing a bed of water softening material, said tank having an opening at its upper portion, a top member normally closing said opening and turnable from a first to a second position on said tank, said top member having two passages therethrough at the underside of said member, means exterior of said tank for supplying water to one of said passages, means exterior of said tank for carrying off water from the other of said passages, a conduit mounted within said tank and having its lower end communicating with the interior of the tank near the lower end of the tank and its upper end communicating with one of said passages in the top member when said top member is in said first position and with the other of the passages in the top member when the top member is turned to its second position, the passage in the top member which is not in communication with the conduit being in communication with the upper end of the tank, whereby by turning said top member from said first position to said second position the direction of flow of water through said bed of water softening material may be reversed.

LAWRENCE D. WALDRON.